Dec. 30, 1924.
N. J. NIELSEN
1,520,880
STERILIZING AND FILLING IN OF MILK FOR TRANSPORT
Filed May 9, 1922   2 Sheets-Sheet 1
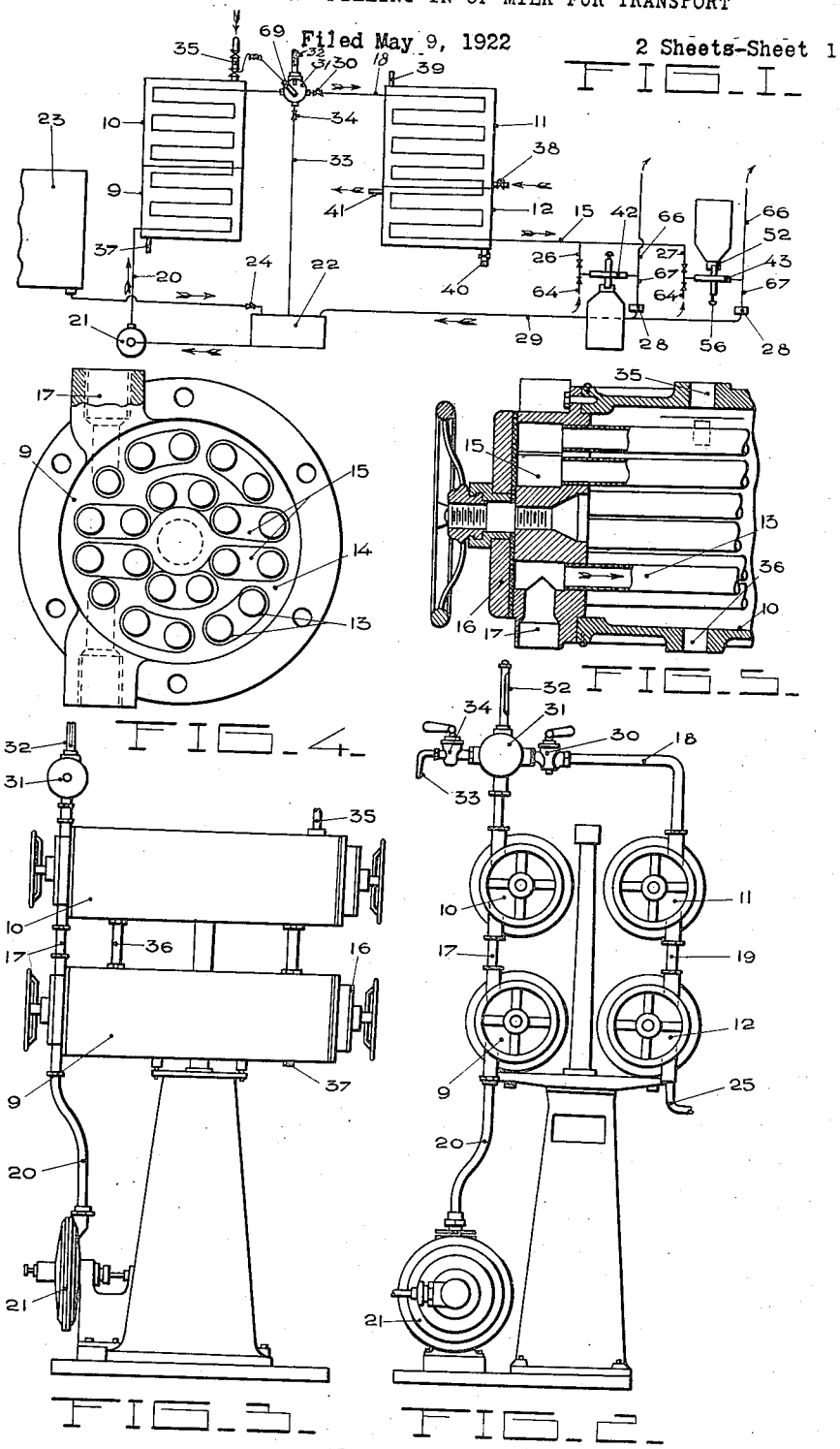
Inventor
N. J. Nielsen,
By Marks Clerk
Attys.

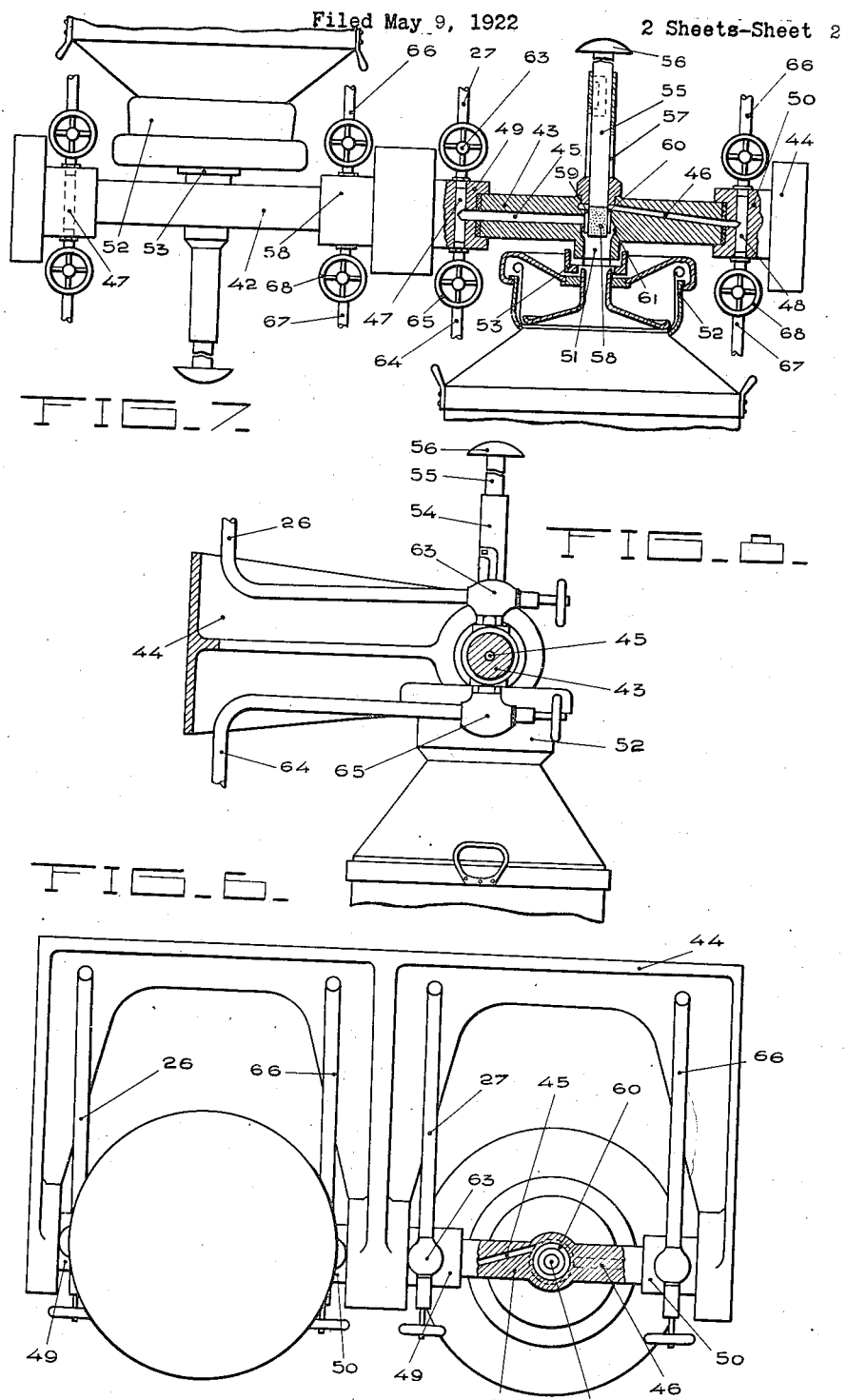

Patented Dec. 30, 1924.

1,520,880

UNITED STATES PATENT OFFICE.

NIELS JONAS NIELSEN, OF AARHUS, DENMARK.

STERILIZING AND FILLING IN OF MILK FOR TRANSPORT.

Application filed May 9, 1922. Serial No. 559,568.

*To all whom it may concern:*

Be it known that I, NIELS JONAS NIELSEN, manufacturer, residing 15 Frederiksgade, Aarhus, in the Kingdom of Denmark, have invented certain new and useful Improvements in Sterilizing and Filling in of Milk for Transport, of which the following is a full, clear, and exact description.

The object of my invention is the procuring of milk in a keeping condition so as to enable the transport of milk to great towns from their more distant surroundings from agricultural countries to industrial countries or generally under conditions where the ordinary pasteurizing of the milk at temperatures below 100 centigrades and filling in transport vessels in ordinary manner is insufficient to prevent the milk from becoming sour.

According to the invention the milk is heated to a temperature above 100 centigrades, preferably to about 130 centigrades, as has already been proposed for destroying all germs in the milk, and after the milk has thus been brought in a completely sterile state I fill it directly into vessels or transport cans previously sterilized and adapted to be closed with a sterilized closure. Thus the sterile milk enclosed is under sterile condition in sterile vessels and in this state the milk may be kept for as long a time and may be transported as far as the economical conditions make it advantageous.

My invention consists in procuring a sterile dairy chiefly comprising a sterilizer and a filling device both working continuously and the former allowing the milk, for a very short time, say about one minute, to be heated to the high temperature before mentioned in combination with an improved continuous filling device whereby the cans or other transport vessels may be sterilized and filled without any intermediate risk of infection in simple manner not involving carrying out the filling operation in a sealed sterilized chamber: accordingly I arrange the filling device with alternative branches in such a manner that the cans, after being applied to the filling device and directly before their filling with milk, may be filled with a hot sterilizing medium, hot air or steam, so as to make after-infections from the air of the previously sterilized cans negligible. The invention consists further in the other improvement specifically claimed.

One form of construction of apparatus for carrying out this continuous sterile process in accordance with my invention is shown, by way of example, on the drawings. Fig. 1 shows diagrammatically the apparatus as a whole. Figs. 2 and 3 are an end view and a side view, respectively, of the cooler and sterilizer built together. Figs. 4 and 5 are details in a larger scale. Figs. 6, 7 and 8 show the filling device in plan view elevation and section respectively.

According to Figs. 2 to 5, there are on a suitable common stand four cylinders 9, 10, 11 and 12 each containing a number of tubes 13, projecting into the ends 14 which have grooves 15 in the outer side in which the tubes are housed in pairs, so that the tubes, when these grooves are closed by a cover 16, form one single conduit. These four conduits are connected in series through a connecting member 17, a tube 18 and a connecting member 19, so as to form one continuous conduit. The inlet end of this conduit is through a tube 20, Fig. 1, connected with the pressure side of a suitable milk pump 21, suction side communicates with a container 22 to which the milk is led from a main container 23 through a float-regulated valve 24. The outlet end of the conduit is through a tube 25 and branches 26, 27. . . connected with filling places where there are small containers 28 for receiving the surplus of milk and connected with the container 22 through a tube 29. The tube 18 has a regulating member 30 and before this an extension or the like 31 for receiving a thermometer 32 and connected with the container 22 through a tube 33 having a regulating member 34.

The cylinders 9 and 10, arranged at the one side of the stand, serve as heating jackets. At the top of the cylinder 10 there is a controllable steam inlet 35, Fig. 3, and between the two cylinders there is a connection 36 permitting the steam and the condensed water to enter the cylinder 9 which has an outlet 37 at its bottom. These two cylinders and the tubes 13 contained therein form the sterilizer.

The cylinders 11 and 12 lying at the other side of the stand serve as cooling jackets. The former has a water inlet 38 and an outlet 39 and the latter has a brine inlet 40 and an outlet 41.

At the filling places horizontal shafts 42 and 43, see Figs. 1, 6 and 7, are turnably mounted in a frame 44. The shafts have longitudinal canals 45 and 46 communicating with cross canals 47 and 48 respectively, in the frame or in bushes 49 and 50 fitted therein. Each shaft has a cross canal 51 at the one end of which the neck 52 of the transport vessel or can may be fixed through a screw connection 53. At the other end of the cross canal 51 there is a cylinder 54 having a piston 55 with an outer head 56. A cork—or stopper—magazine, not shown on the drawing, and containing the corks in a sterile state, is arranged near the cylinder 54. A lateral opening 57 in the latter permits the introduction of a cork 58 one by one below the piston. The latter when pressed down to a certain point first brings the cork into an initial position, inside a bush 59, and by further pressing the piston, the cork is forced into the neck of the milk can. All round the bush 59 there are annular spaces 60 and 61, the former communicating directly with the cross canal 51 and forming an extension thereof, the latter communicating therewith through grooves inside the bush or through holes therein. The longitudinal canal 46 opens into the space 60 while the other longitudinal canal 45 opens into the space 61 tangentially thereto.

The cross canal 47 in the bush 49 communicates at one end with one of the branches 26, 27... through a regulating member 63 and at the other end with a steampipe 64 having a regulating member 65. The cross canal 48 in the bush 50 has at one end a regulable outlet 66 and communicates at the other end with a tube 67, having a regulating member 68 and communicating with one of the above-mentioned small containers 28.

In starting the apparatus steam is blown through the conduit formed by the tube 20, the tubes 13 in the cylinders 9, 10, 11 and 12, the connections 17, 18 and 19ᵐ the tube 25, the branches 26, 27... the cross canals 47, 48, the longitudinal canals 45, the space 61 and thereby this conduit, which afterwards conducts the milk, is sterilized.

I prefer to introduce the steam at the filling places, and to let it pass through the conduit in the direction against the sterilizer or the tube 20, so as to ensure that the part of the conduit afterwards cooled is thoroughly sterilized.

Simultaneously herewith, steam at a suitable temperature and pressure is led into the cylinder 10, and thus this cylinder and the cylinder 9 are heated. Furthermore a sterilizing apparatus, enabling the sterilizing of the transport vessels or cans to be filled with milk, is brought to work so as to ensure the presence of sterile cans at any moment required. As this apparatus for sterilizing the cans forms no part of the present invention, I omit to describe it here.

As soon as the thermometer shows that the milk has reached the temperature of about 130 centigrades, the regulating member 30 is opened and the regulating member 34 is closed, so that the milk now runs through the conduit in the cylinders 11 and 12, these being now cooled by water and brine. The highly heated and afterwards cooled milk runs through one of the branches 26, 27... viz, the branch whose regulating member 62 is just open and further through the cross canal 47 and the longitudinal canal 45. Hence it runs into the space 61 in a tangentially direction so as to follow the wall of this space and the wall of the cross canal 51 and also the wall of the neck 52 thus filling the milk can while leaving a free space in the centre of the neck 52 and the cross canal permitting the air in the can to escape freely through this central space end through the canal 46, the cross canal 50 and the tube 67, the regulating member 68 being open. When the can has been filled up a surplus of milk runs through the tube 67 into the small container 38 and now the regulating member 62 of the branch 26 or 27 hitherto open, say the branch 26, is closed. The cork 58 which during the filling operation described lies in its position within the bush 59 position indicated above as "initial" is forced into the neck 52 and now the can thus filled and corked is unscrewed from the shaft 42.

During the filling operation described another can was applied to the other shaft 43. a cork introduced through the opening 57 into the cylinder 54 belonging to this shaft and the piston 55 pressed down so far that this cork was brought into its initial position inside the bush 59. Then, this shaft was turned 180 degrees with the can upside down and its steam inlet 64 opened so as to permit steam to pass through the cross canal 47 the longitudinal canal 45 the space 61 surrounding the cork and the cross canal 51 thus simultaneously further sterilizing the cork. After this supplementary sterilizing of the previously sterilized cork and can the shaft 43 was turned back and the steam inlet 64 was closed. The tube 66 being open, permits the equalizing of the pressure in the can and then, as soon as the regulating member 63 of the branch 23 is opened, the milk fills the can and the air escapes through the tube 66.

It is to be understood that during the filling of a can, another can already filled is unscrewed and a new can is applied, turned, sterilized and turned back and thus made ready for filling so that one of the branches 26, 27... is always open and the milk allowed to run continuously through the tubes 13.

The sterilizing temperature of the milk preferably about 130 centigrades may be kept constant by means of a thermostatic device 69, Fig. 1, influenced by the milk passing through the extension 31 and acting upon the steam inlet 35 to the cylinder 10 so as to obstruct this more or less when the temperature rises, while it opens it when the temperature falls.

I do not confine myself to the form described of the sterilizer, cooler, and filling device; they may be varied in different ways within the limits of my invention, which consists chiefly in that a sterilizer working continuously and permitting the milk or the like in great quantities to be heated to the high temperature beforementioned, is directly combined with a filling device, comprising, alternative branches, also working continuously in the manner set forth, and permitting milk to be directly filled into sterile transport vessels or cans, without loss of the sterility, either of the milk or of the cans thus securing the advantage mentioned in the preamble.

I claim:

1. In an apparatus of the character described, a system of tubes forming a continuous conduit having an inlet end and a branched outlet end, pumping means connected with the inlet end of the conduit, means for heating a portion of the conduit lying contiguous to the pumping means to a temperature above 100° centigrade, means for cooling a portion of the conduit lying beyond the heating means, vessel filling devices connected with the branches of the conduit, and vessel sterilizing means associated with the filling devices.

2. In an apparatus of the character described, a fluid conducting conduit, heating means associated with said conduit, cooling means associated with said conduit, said conduit having an inlet end and a branched outlet end, filling devices associated with the branches of the outlet end of the conduit, and means for alternately cutting off the flow of fluid to the vessel filling devices to facilitate the removal of a filled vessel coincident with the filling of an empty vessel.

3. In an apparatus of the character described, a fluid conducting conduit having inlet and outlet ends, means for sterilizing and cooling the fluid traversing various portions of the conduit, branches connected with the outlet end of the conduit, vessel filling devices associated with said branches, fluid regulating means permitting the removal of a filled vessel coincident with the delivery of fluid to another vessel through the filling device, and means for sterilizing the empty vessel preliminary to the admission of fluid thereto.

4. In an apparatus of the character described, a vessel filling device, means to establish an air-tight connection between a vessel and said filling device, means for delivering a sterilizing medium to a vessel connected with the filling device, and means for subsequently delivering a sterilizing fluid to the vessel while the latter is still applied to the filling device.

5. An apparatus as claimed in claim 1, characterized by the provision of a sump, and means for returning surplus fluid from the filling devices to said sump.

6. An apparatus as claimed in claim 2, characterized by the provision of a sump, and means for returning surplus fluid from the filling devices to said sump.

7. An apparatus as claimed in claim 3, characterized by the provision of a sump, and means for returning surplus fluid from the filling devices to said sump.

8. An apparatus as claimed in claim 4, characterized by the provision of a sump, and means for returning surplus fluid from the filling devices to said sump.

9. In an apparatus of the character described, a plurality of vessel filling devices, and means for attaching transport vessels to said devices, said filling devices being relatively rotatable whereby the transport vessel attached thereto may be moved to an inverted position preliminary to the filling thereof, and means for sterilizing the vessel while in an inverted position.

10. An apparatus as claimed in claim 1, characterized in that the filling devices are relatively rotatable whereby to permit the vessel associated therewith to be moved to an inverted position for sterilizing purposes preliminary to the filling thereof.

11. An apparatus as claimed in claim 2, characterized in that the filling devices are relatively rotatable whereby to permit the vessel associated therewith to be moved to an inverted position for sterilizing purposes preliminary to the filling thereof.

12. An apparatus as claimed in claim 3, characterized in that the filling devices are relatively rotatable whereby to permit the vessel associated therewith to be moved to an inverted position for sterilizing purposes preliminary to the filling thereof.

13. An apparatus as claimed in claim 1, characterized by the provision of cork inserting means associated with the filling devices, the cork inserting means being so arranged as to permit the cork to be sterilized simultaneously with the sterilization of the vessel.

14. An apparatus as claimed in claim 2, characterized by the provision of cork inserting means associated with the filling devices adapted to insert corks in the vessels subsequent to the filling of the latter, and means for sterilizing the corks preliminary to their incertion in the vessels.

15. An apparatus as claimed in claim 3 characterized by the provision of cork inserting means associated with the the filling devices adapted to insert corks in filled vessels, said cork inserting means being so arranged as to cause the corks to be sterilized by the vessel sterilizing means preliminary to their insertion in the vessels.

16. An apparatus as claimed in claim 4, characterized by the provision of a cork inserting device associated with the filling devices and arranged to subject a cork to sterilization by the sterilizing medium preliminary to its insertion in a vessel.

17. In an apparatus as claimed in claim 1 characterized by the provision of means to impart a rotary motion to the fluid entering the vessels from the filling devices whereby to leave a free space for the passage of air in the neck of the vessel during filling.

18. An apparatus as claimed in claim 2 characterized by the provision of means to impart a rotary motion to the fluid entering the vessels from the filling devices whereby to leave a free space for the passage of air in the neck of the vessel during filling.

19. An apparatus as claimed in claim 3 characterized by the provision of means to impart a rotary motion to the fluid entering the vessels from the filling devices whereby to leave a free space for the passage of air in the neck of the vessel during filling.

20. In an apparatus as claimed in claim 1, characterized by the provision of a heating means including a plurality of fluid conducting tubes arranged in pairs and end pieces having recesses therein receiving and establishing communication between the tubes of each pair, and removable covers normally closing said recesses.

21. In an apparatus as claimed in claim 2, characterized by the provision of a heating means including a plurality of fluid conducting tubes arranged in pairs and end pieces having recesses therein receiving and establishing communication between the tubes of each pair, and removable covers normally closing said recesses.

22. In an apparatus as claimed in claim 3, characterized by the provision of a heating means including a plurality of fluid conducting tubes arranged in pairs and end pieces having recesses therein receiving and establishing communication between the tubes of each pair, and removable covers normally closing said recesses.

23. In an apparatus of the character described, a plurality of vessel filling devices, a conduit for delivering sterilized fluid to said filling devices, and means for alternately admitting sterilized fluid to the respective filling devices.

In witness whereof I subscribe my signature, in the presence of two witnesses.

NIELS JONAS NIELSEN.

Witnesses:
 ANNA CHRISTENSEN,
 TH. MELBALLE.